Feb. 25, 1969  P. W. COVERT  3,430,142

DIRECT CURRENT MEASUREMENT APPARATUS

Filed Nov. 25, 1964  Sheet 1 of 2

INVENTOR
PAUL W. COVERT

BY Shanley & O'Neil
ATTORNEYS

INVENTOR
PAUL W. COVERT

Shanley & O'neil
BY ATTORNEYS

United States Patent Office 3,430,142
Patented Feb. 25, 1969

3,430,142
DIRECT CURRENT MEASUREMENT
APPARATUS
Paul W. Covert, Valencia, Pa., assignor to Magnetics, Inc., a corporation of Pennsylvania
Filed Nov. 25, 1964, Ser. No. 413,897
U.S. Cl. 324—117     4 Claims
Int. Cl. G01r 33/02

ABSTRACT OF THE DISCLOSURE

Improved direct current measuring device providing precision current measuring capability. A reactor-rectifier circuit is magnetically linked by saturable cores to a DC power conductor in which current is to be measured. Leakage current means shunt rectifiers in the reactor-rectifier circuit to reset flux levels in the saturable cores such that output of the reactor-rectifier current measuring circuit is at a minimum when current in the DC conductor is zero. This permits continuity in current measurement as current in the DC conductor approaches zero. Also the effect of the magnetizing current of the reactor-rectifier current measuring circuit, which varies with variations in temperature and AC voltage supply thereby introducing a variable error in the direct current measurement, is offset with saturable reactor compensating circuit means which generate a signal equal and opposite to the magnetizing current of the reactor-rectifier to provide accurate readings of plus or minus .01% at full scale rating.

---

Figure 1:
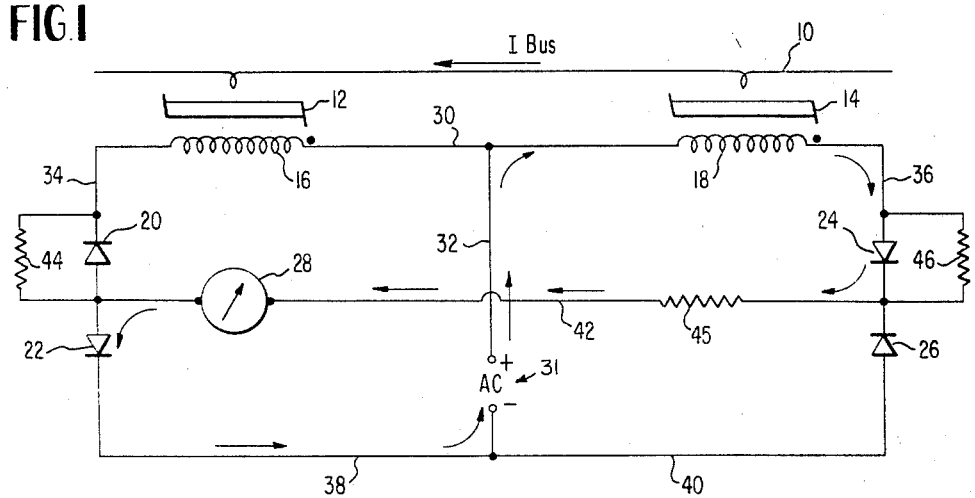

This invention is concerned with precision measurement of direct current and a device for magnetically measuring current in a DC conductor.

The advantages of magnetic current measuring devices over those which must be physically connected to a conductor are widely recognized. The simple series transductor as described in "Transductors and Magnetic Amplifiers" by A. G. Milnes, page 231, published by Mc-Millan and Co. Ltd., 1957, is a well-known form of current measuring magnetic device. Use of self-magnetization principles in a magnetic amplifier for direct current measurement has been recognized, e.g. the patent to Borg, No. 2,712,635. However, none of the prior art magnetic devices have found extensive use, especially at high current levels, where precision current measurement was desired since these devices were limited to accuracy of ±1% of full scale rating. Part of the present invention has been the discovery and analysis of inherent magnetic errors and discrepancies introduced by changes in environmental conditions or circuit variables which have impaired precision current measurement by magnetic means. By applying the teachings of the present invention, accuracy of ±.01% full scale rating may be realized.

It is an object of the present invention to provide a novel magnetic device for precision measurement of current in a DC conductor regardless of changes in environmental conditions or circuit variables.

Figure 2:
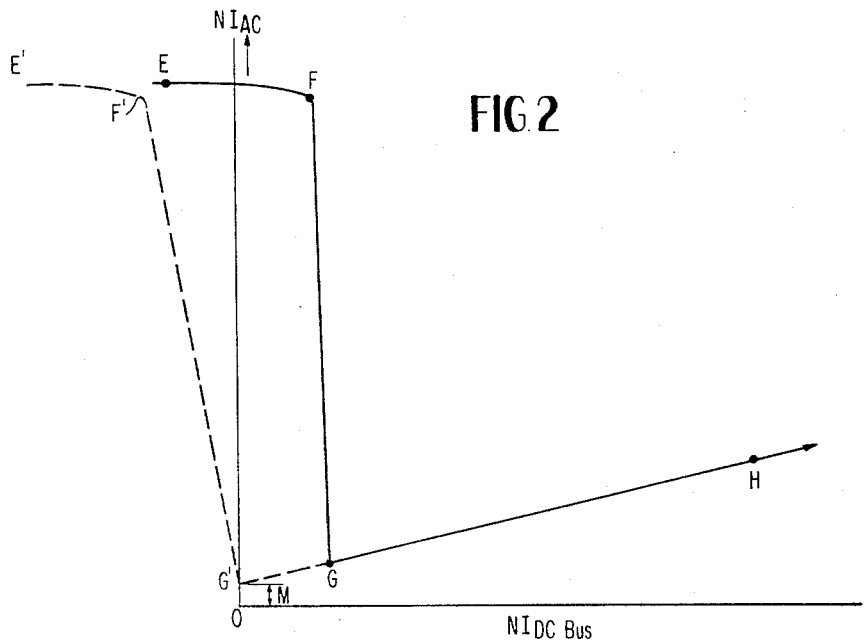
Figure 3:
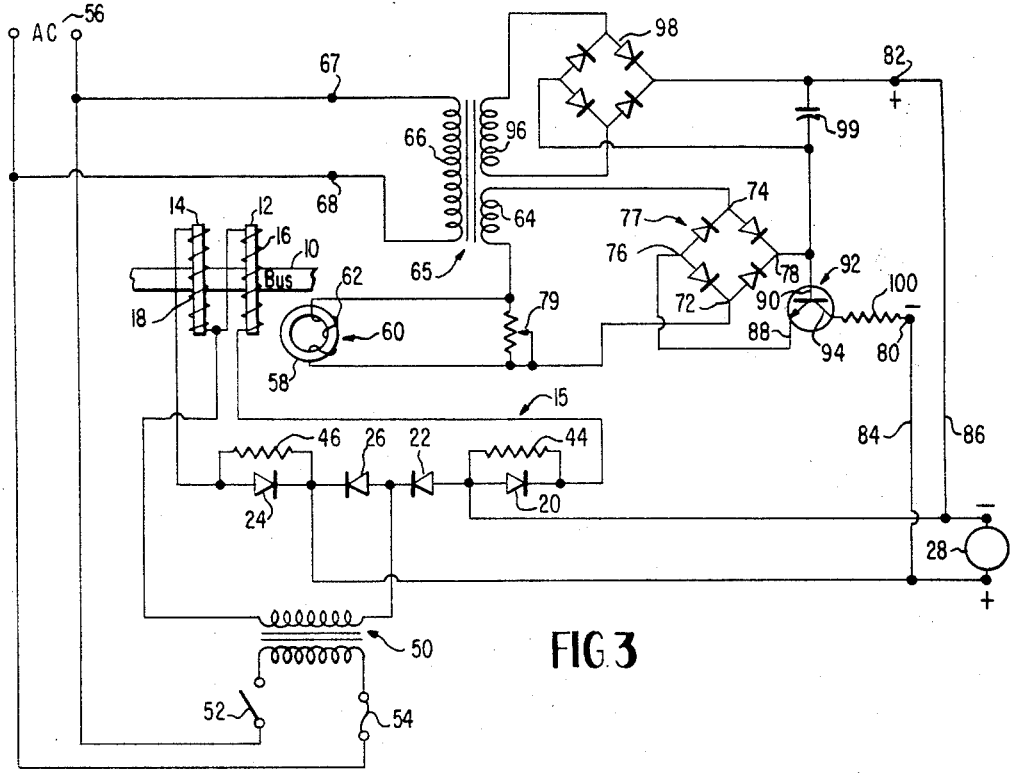
Figure 4:
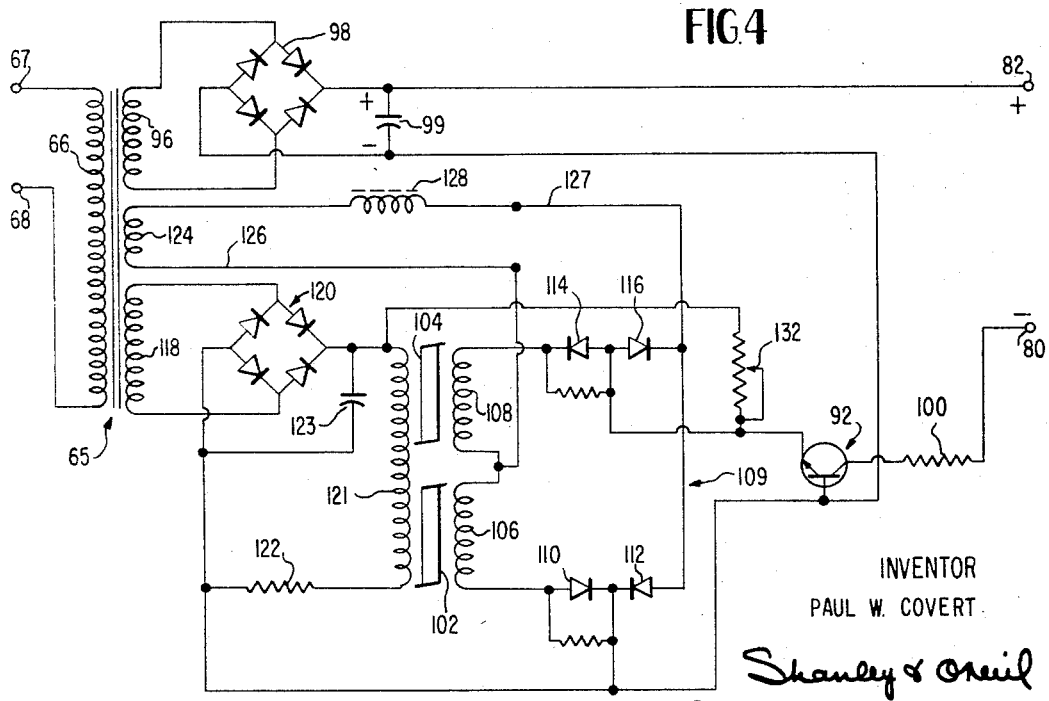

In describing the invention, reference will be had to the accompanying drawings wherein like reference numerals are used to indicate like elements:

FIGURE 1 is a circuit embodying the invention;
FIGURE 2 is a representation of the transfer curve for the magnetic device of the invention;
FIGURE 3 is a schematic circuit diagram, including the circuit of FIGURE 1 and compensating apparatus, embodying the invention; and
FIGURE 4 is another embodiment of compensating apparatus for the circuit of FIGURE 1.

In the present invention a reactor-rectifier circuit is linked to a DC conductor by a pair of magnetically saturable paths. Current in reactor windings wound on each saturable path is controlled by unidirectional conducting devices, and utilizing saturation phenomena in the magnetic paths, a magnetic device is provided which functions as a DC transformer to produce an output directly proportional to current in the DC conductor.

Referring to FIGURE 1, DC bus 10 acts as a single turn winding on saturable cores 12 and 14.

An AC powered circuit 15 is linked to cores 12 and 14 by reactor windings 16 and 18 respectively. AC voltage source 20 provides power for reactor windings 16 and 18 in which current is direction controlled by rectifiers 20, 22, 24 and 26. The rectifiers are connected in a bridge circuit to produce rectified full-wave output measured at meter 28.

Reactor windings 16 and 18 are wound as indicated by the dots and are connected by conductor 30. The latter is connected to AC source 31 by conductor 32. Reactor winder 16 is connected to rectifier 20 by conductor 34 and reactor 18 is connected to rectifier 24 by conductor 36. Rectifier 22 is connected to AC source 31 by conductor 38 and rectifier 26 is connected to AC source 31 by conductor 40. Conductor 42, including burden resistor 45, connects meter 28 across the rectifying bridge.

Assuming a half cycle of the AC source 31 with polarity as shown in FIGURE 1, the current path is through conductor 32 and through reactor winding 18, connector 36, rectifier 24, connector 42 including resistor 45 to meter 28, rectifier 22, and connector 38 returning to AC source 31.

In the next half cycle of AC source 31, the current path will be through connector 40, rectifier 26, connector 42 including resistor 45 and meter 28, rectifier 20, connector 34, winding 16, connector 30 to connector 32, returning to AC source 20. Discounting core losses which will be considered later, current during each half cycle is determined and limited by the current existing in DC bus 10 and the turns ratio between reactor windings and bus winding. Current transformer action in each circuit arm of the reactor-rectifier limits current in each half cycle of AC source 31 and is based on net ampere turns balance principles.

With the circuit described thus far output from the AC powered circuit 15 operates on self-saturating magnetic amplifier principles in the absence of DC input from bus 10. Because of these principles, the output of AC powered circuit 15 is at a maximum when input from DC bus 10 is zero. This is shown in FIGURE 2 which illustrates the transfer curve EFGH for the reactor-rectifier circuit in which output of the circuit is plotted along the ordinate versus DC input from bus 10, plotted along the abscissa. With no power in DC bus 10, cores 12 and 14 would saturate and remain in saturation, presenting the problem of burning out the reactor-rectifier.

One possible solution to this problem is to maintain an auxiliary DC control input to the reactor-rectifier. However, the effect of such an auxiliary input is to modify the transfer curve of the reactor-rectifier at the cost of precisional DC measurement. In accordance with the teachings of the invention this problem is solved without in any way modifying the transfer curve of the reactor-rectifier and without auxiliary power sources.

The invention teaches provision of a leakage current path during the nonconducting half cycle established by the rectifiers for a reactor winding. Leakage current resets flux level in a core during the normally nonconducting half cycle of its associated reactor winding. Referring to FIGURE 1, a current leakage path is established around blocking rectifiers by leakage resistor 44 connected across rectifier 20 and leakage resistor 46 connected across rectifier 24. During the half cycle indicated in FIGURE 1, leakage current bypasses blocking rectifier 20 through leakage resistor 44 to reset flux level in core 12.

The effect of this leakage current is to move the transfer curve to the left, shown partially in dotted lines in FIGURE 2 as E'F'G'GH. With the latter transfer curve output of the reactor-rectifier is at a minimum when DC input is zero. Also the discontinuity in ampere-turn relationship in self-saturating magnetic amplifiers in that portion of a transfer curve shown as GG', normally observed as DC input approaches zero, is removed without in any way distorting the transfer curve.

It can be seen from FIGURE 2 that the output of the reactor-rectifier measured along G'GH, is directly proportional to the DC input except for an error term M. This can be explained from a consideration of the output of the reactor-rectifier at meter 28. This output has two components, the magnetizing current of the reactor-rectifier and the DC input component. Magnetizing current represents energy losses in the saturable paths of the reactor and M of FIGURE 2 is a function of these losses. The invention makes provision for sustained precision current measuring under varying conditions which affect the value of the magnetizing current. Magnetizing current has no relation to DC input. Further this energy loss varies with changes in temperature and fluctuation in the AC voltage supply. The effect of these variations on the magnetizing current has prevented accurate direct current measurement over sustained periods by magnetic means. The invention makes provision for the effect of magnetizing current and variations in magnetizing current by producing a compensating current which varies with changes in temperature and AC voltage supply. This compensating current is utilized in opposite polarity relationship to the output of the current measuring reactor-rectifier to nullify the effect of magnetizing current and its variations.

In FIGURE 3 the reactor-rectifier circuit is shown with bus 10 passing within the internal diameter of toroidal cores 12 and 14. The AC powered circuit 15 of the current measuring reactor-rectifier is connected as shown in FIGURE 1 to produce a full-wave rectified output at meter 28. Isolation transformer 50, along with switch 52 and fuse 54, couples circuit 15 to AC source 56.

Core 58 is positioned in close proximity to cores 12 and 14 and is made of substantially the same saturable core material as used in the current measuring reactor-rectifier.

Core 58 forms part of saturable reactor 60 which includes winding 62 connected to secondary winding 64 of transformer 65. Primary winding 66 of transformer 65 is connected at terminals 67, 68 to AC power source 56. The output of saturable reactor 60 is connected at terminals 72 and 74 across bridge rectifier 76. A full-wave rectified output is produced at terminals 76 and 78 of the bridge rectifier.

By the above selection of environment, power supply, and core material, the output of saturable reactor 60 is subject to the same temperature variations and supply voltage fluctuations as the current measuring reactor-rectifier. In accordance with the teachings of the invention, a current compensating signal is derived which will vary with the magnetizing current of the current measuring reactor-rectifier and which, by selection of turns in winding 62 and use of trimming resistor 79, has a value equal to the magnetizing current of the current measuring reactor-rectifier; this compensating signal is then connected in opposite polarity relationship with the output of the current measuring reactor-rectifier.

The output of the current measuring reactor-rectifier will be at a higher voltage level than the compensating current from saturable reactor 60 and must be connected through a high impedance to terminals 80 and 82 to avoid feedback of the current measuring reactor-rectifier into the compensating circuit. As shown in FIGURE 3, connectors 84 and 86 join terminals 80 and 82 to the output of the reactor-rectifier.

The number of turns in winding 62 is selected so that magnetizing current of saturable reactor 60, as delivered through a high impedance device, has an average value substantially equal to the magnetizing current error of the current measuring reactor-rectifier to be compensated. The output of saturable reactor 60 at terminals 76 and 78 of bridge rectifier 77 is connected to emitter 88 and base 90 of NPN transistor 92. A DC supply voltage between base 90 and a collector 94 of the transistor 92 is provided by winding 96 and bridge rectifier 98. Filtering capacitor 99 is connected across this power supply. Collector 94 of the transistor is connected through resistor 100 to terminal 80. The collector-base output of transistor 92 matches that of saturable reactor 60 due to the use of the transistor in "common base" connection, i.e., the base is connected in common with the negative side of the transistor supply voltage and the positive side of the saturable reactor output.

FIGURE 4 shows a preferred embodiment for a compensating circuit in which the instantaneous as well as average value of the magnetizing current of the current measuring reactor-rectifier circuit and the output of the compensating circuit are equal so that no ripple or harmonic values exist at meter 28. This embodiment uses a compensating reactor-rectifier circuit with two small cores of magnetic material similar to that of the magnetic materials used in the current measuring reactor-rectifier circuit. These cores are positioned in a similar environment and are powered from the same AC source as the current measuring reactor-rectifier.

The compensating circuit of FIGURE 4 may be substituted for the compensating circuit of FIGURE 3 by connection at AC input terminals 67 and 68 and at the output terminals 80 and 82. This compensating reactor-rectifier includes saturable cores 102 and 104 wound with reactor windings 106 and 108 which are connected in a bridge circuit 109 including rectifiers 110, 112, 114 and 116.

A control input for the compensating reactor-rectifier is derived at secondary winding 118 and rectified at bridge rectifier 120. The rectified input signal is delivered to DC input winding 121 through resistor 122. Filtering capacitor 123 is connected across this power supply to DC input winding 121. AC input for the compensating reactor-rectifier is derived at secondary winding 124 and delivered over leads 126 and 127. Inductor 128 is connected in lead 127.

The high impedance circuit of FIGURE 4 is similar to that of FIGURE 3 with the DC supply voltage derived at winding 96, rectified at bridge rectifier 98, and established across the base and collector terminals of NPN transistor 92.

Operation of the compensating reactor-rectifier of FIGURE 4 is similar in principle to the operation of the current measuring reactor-rectifier described earlier. The output from the compensating reactor-rectifier comprises two components, its magnetizing current and a component due to the DC input through winding 121. Both components are fed into the emitter-base terminals of NPN transistor 92. At the same time a signal of opposite polarity to the direct current input component of the reactor-rectifier, and derived from the same DC source, is fed into the same emitter-base terminals of NPN transistor 92. The collector current of the transistor 92 is then limited to magnetizing current which is fed in output opposed polarity relationship to the current measuring reactor-rectifier at terminals 80 and 82.

Operating the compensating reactor-rectifier with a DC input accurately provides a compensating current which has an instantaneous value substantially equal to the instantaneous value of the magnetizing current of the current measuring reactor-rectifier. With no DC input to the compensating reactor-rectifier its magnetizing current tends to be indefinite; a DC control signal stabilizes this magnetizing current. Also shunts across the rectifiers of the reactor-rectifier are not essential since input DC is a "normal off" control for the circuit but are provided as a second "normal off" control for the circuit.

Slight adjustments in the compensating current are possible by varying the mixing and trimming resistor 132. However, this should not be used to any major extent since a proper ratio between resistors 132 and 122 based on the turns ratio between the AC winding and DC input winding of the compensating reactor-rectifier should be maintained.

To calibrate a compensating reactor-rectifier the cores 102 and 104 are wound to provide a close match between the magnetizing current of the compensating reactor-rectifier and that of the current measuring reactor-rectifier. Final trimming, if required, can then be carried out with the trimming resistor 132. The AC windings on the compensating reactor-rectifier cores can also be tapped to provide individual matching.

Inductor 128 in the AC supply of compensating reactor-rectifier can be used to correct for minor phase shifts between the compensator output and the current measuring reactor-rectifier output. Taps can be provided on this inductor for trimming.

Core material for precision current measurement should have good rectangularity or squareness ratio (ratio of saturation flux density to retentive flux denisty). Suitable materials include Orthonol, Permalloy, and grain oriented silicon steel. As pointed out in the specification, the core materials of the current measuring reactor-rectifier and the compensating means should be like materials with substantially the same magnetic properties.

Typical circuit values for a specific embodiment of the invention include:

Reactor windings 16, 18—5000 turns
Rectifiers 20, 22, 24, 26—Silicon rectifiers rated at 10 amps
Leakage Resistors 44, 46—100 ohms, 20 watts
Burden Resistor 45—0 to 4 ohms
AC supply 56—120 v.
Winding 62—475 turns
Trimming resistor 79—100,000 ohms potentiometer
Primary winding 66—1900 turns
Winding 64—192 turns
Transistor 92—2N698 or 2N699
Winding 96—845 turns
Capacitor 99—100 mfd. (150 v. DC)
Resistor 100—4000 ohms
Windings 106, 108—500 turns
Leakage resistors (across rectifiers 110, 114)—150 ohms
Winding 118—600 turns
AC input winding 121—50 turns
Resistor 122—1000 ohms
Capacitor 123—200 mfd. (150 v. DC)
Winding 124—192 turns
Trimming resistor 132—15,000 ohms
Inductor 128—50 mhy.

It is understood that various changes and modifications may be made to details of the foregoing without departing from the spirit of the invention or the scope of the appended claims.

What is claimed is:

1. Device for magnetically measuring current in a DC conductor comprising
reactor-rectifier circuit means including a pair of saturable paths for magnetically linking the reactor-rectifier circuit means to a DC conductor, reactor winding means wound on each saturable path, and unidirectional conducting means permitting current in one direction only through each reactor winding means,
output terminal means connected to the reactor-rectifier circuit means,
bias means including current leakage means connected across the unidirectional conducting means for resetting flux level in each saturable path of the reactor-rectifier circuit means such that output of the reactor-rectifier circuit means is at a minimum when current in the DC conductor is zero,
compensating circuit means including saturable reactor means for generating a signal to compensate for magnetizing current of the reactor-rectifier circuit means, the saturable reactor means including saturable core means consisting of magnetically saturable material having substantially identical magnetic properties to those of the saturable paths of the reactor-rectifier circuit means,
means for connecting the compensating circuit means to the output terminal means in opposed polarity relationship to the output of the reactor-rectifier circuit means, and
means for connecting a single AC voltage source to supply AC power to both the reactor-rectifier circuit means and the compensating circuit means.

2. Device for magnetically measuring current in a DC conductor comprising
current measuring reactor-rectifier circuit means including a pair of saturable cores for magnetically linking the reactor-rectifier circuit means to a DC conductor, reactor winding means wound on each saturable core, and rectifier means in series with each reactor winding means for providing rectified full-wave output from the reactor-rectifier circuit means and permitting current in one direction only through each reactor winding means,
output terminal means connected to the current measuring reactor-rectifier circuit means,
bias means including current leakage means connected across the rectifier means for resetting flux level in each saturable core of the reactor-rectifier circuit means such that output of the current measuring reactor-rectifier circuit is at a minimum when current in the DC conductor is zero,
compensating reactor-rectifier means for producing current to compensate for magnetizing current of the current measuring reactor-rectifier circuit means including a pair of saturable cores located in close proximity to the saturable cores of the current measuring reactor-rectifier circuit means and consisting of material having magnetic properties substantially identical to magnetic properties of the saturable cores of the current measuring reactor-rectifier circuit means,
transistor means for connecting output of the compensating reactor-rectifier circuit means in opposed polarity relationship to output of the current measuring reactor-rectifier circuit means, and
means for connecting a single AC voltage source to supply AC power to both the current measuring reactor-rectifier circuit means and the compensating reactor-rectifier means.

3. The device of claim 2 further including
means for delivering a direct current control input to the compensating reactor-rectifier means for stabilizing the magnetizing current of the compensating reactor-rectifier means, and
means connected to the transistor means for removing such direct current control input from output of the compensating reactor-rectifier means to limit such output to stabilized magnetizing current.

4. Device for magnetically measuring current in a DC conductor comprising
reactor-rectifier circuit means including a pair of saturable paths for magnetically linking the reactor-rectifier circuit means to a DC conductor, reactor winding means wound on each saturable path, and unidirectional conducting means permitting current in one direction only through each reactor winding means,
output terminal means connected to the reactor-rectifier circuit means,
bias means including current leakage means connected across the unidirectional conducting means for resetting flux level in each saturable path of the reactor-rectifier circuit means such that output of the reactor-rectifier circuit means is at a minimum when current in the DC conductor is zero, compensating circuit means including saturable reactor means for generating a signal to compensate for magnetizing current of the reactor-rectifier circuit means, the saturable reactor means including saturable core means consisting of magnetically saturable material having substantially identical magnetic properties to those of the saturable paths of the reactor-rectifier circuit means, high impedance means for connecting output of the compensating circuit means in opposed polarity relationship to output of the reactor-rectifier circuit means while avoiding feedback from the reactor-rectifier circuit means into the compensating circuit means, and means for connecting a single AC voltage source to supply AC power to both the reactor-rectifier circuit means and the compensating circuit means.

References Cited

UNITED STATES PATENTS

| | | | |
|---|---|---|---|
| 1,825,514 | 9/1931 | Fitzgerald | 324—117 |
| 2,157,006 | 5/1939 | Oesinghaus | 324—117 |
| 2,269,584 | 1/1942 | Eldredge | 324—43 |
| 2,712,635 | 5/1955 | Borg | 324—127 |
| 2,954,519 | 9/1960 | House | 330—8 XR |
| 3,159,785 | 12/1964 | Benyon | 324—43 |

RUDOLPH V. ROLINEC, *Primary Examiner.*

E. F. KARLSEN, *Assistant Examiner.*

U.S. Cl. X.R.

324—127